(12) United States Patent
Melin et al.

(10) Patent No.: US 12,214,518 B2
(45) Date of Patent: Feb. 4, 2025

(54) SPROCKET ARRANGEMENT, SAW CHAIN, AND COMBINATION OF SPROCKET ARRANGEMENT AND SAW CHAIN

(71) Applicant: HUSQVARNA AB, Huskvarna (SE)

(72) Inventors: Patrik Melin, Huskvarna (SE); Albin Hagberg, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 790 days.

(21) Appl. No.: 17/251,060

(22) PCT Filed: Mar. 26, 2019

(86) PCT No.: PCT/EP2019/057514
§ 371 (c)(1),
(2) Date: Dec. 10, 2020

(87) PCT Pub. No.: WO2019/238289
PCT Pub. Date: Dec. 19, 2019

(65) Prior Publication Data
US 2021/0245389 A1    Aug. 12, 2021

(30) Foreign Application Priority Data
Jun. 12, 2018 (SE) .................... 1850710-3

(51) Int. Cl.
*B27B 17/08* (2006.01)
*A01G 3/08* (2006.01)
(Continued)

(52) U.S. Cl.
CPC ............. *B27B 17/08* (2013.01); *A01G 3/086* (2013.01); *A01G 23/091* (2013.01); *B27B 17/02* (2013.01);
(Continued)

(58) Field of Classification Search
None
See application file for complete search history.

(56) References Cited

U.S. PATENT DOCUMENTS 2,788,811 A     4/1957  Bernard et al.
3,283,789 A  *  11/1966 Silvon .................... B27B 17/02
                                                30/384

(Continued)

FOREIGN PATENT DOCUMENTS

AU        8561291 A      4/1992
CN     202742449 U       2/2013
(Continued)

OTHER PUBLICATIONS

International Search Report and Written Opinion for International Application No. PCT/EP2019/057514 mailed Jun. 6, 2019.
(Continued)

*Primary Examiner* — Hwei-Siu C Payer
(74) *Attorney, Agent, or Firm* — Burr & Forman LLP

(57) ABSTRACT

In a combination of a sprocket arrangement (128) and a saw chain (16), a sprocket tooth spacing (TI) between consecutive sprocket teeth (40) relates to a drive link spacing between consecutive drive links (30) of the saw chain (16) such that the guide teeth (42) of two or more drive links (30) may enter between a pair of consecutive sprocket teeth (40).

15 Claims, 6 Drawing Sheets

(51) Int. Cl.
*A01G 23/091* (2006.01)
*B27B 17/02* (2006.01)
*B27B 33/14* (2006.01)
*F16H 55/30* (2006.01)

(52) U.S. Cl.
CPC ............. *B27B 33/14* (2013.01); *F16H 55/30* (2013.01); *F16H 2055/306* (2013.01)

(56) References Cited

U.S. PATENT DOCUMENTS

| | | | |
|---|---|---|---|
| 3,298,406 A | 1/1967 | Erickson | |
| 4,060,895 A * | 12/1977 | Hille | B27B 17/025 |
| | | | 30/384 |
| 4,348,199 A * | 9/1982 | Oonuma | F16H 57/02004 |
| | | | 474/151 |
| 4,492,030 A * | 1/1985 | Beerens | B27B 17/04 |
| | | | 30/384 |
| 4,561,181 A * | 12/1985 | Weisgerber | B27B 17/025 |
| | | | 30/387 |
| 5,855,067 A | 1/1999 | Taomo et al. | |
| 6,317,989 B1 | 11/2001 | Forsberg et al. | |
| 9,168,671 B2 * | 10/2015 | Englund | B27B 33/14 |
| 2003/0167895 A1 | 9/2003 | Mang | |
| 2010/0203992 A1 | 8/2010 | Botez | |
| 2015/0176692 A1* | 6/2015 | Roh | F16H 7/06 |
| | | | 474/156 |
| 2017/0073927 A1 | 3/2017 | Blundell et al. | |
| 2019/0366579 A1* | 12/2019 | Melin | B27B 17/08 |
| 2021/0245389 A1* | 8/2021 | Melin | B27B 17/08 |

FOREIGN PATENT DOCUMENTS

| | | |
|---|---|---|
| DE | 3135203 A1 | 3/1983 |
| GB | 2495620 A | 4/2013 |
| JP | S6248501 U | 3/1987 |
| JP | S6248502 U | 3/1987 |
| JP | S6248503 U | 3/1987 |
| WO | 2010115438 A1 | 10/2010 |

OTHER PUBLICATIONS

Swedish Office Action and Search Report for Swedish Application No. 1850710-3, Mailed on Dec. 6, 2018.

* cited by examiner

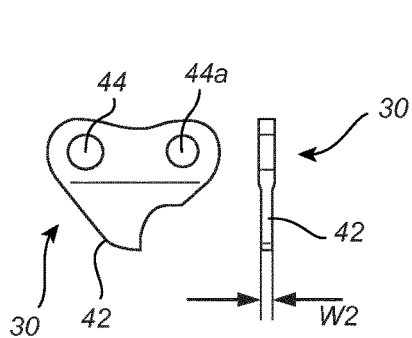
Fig. 3A
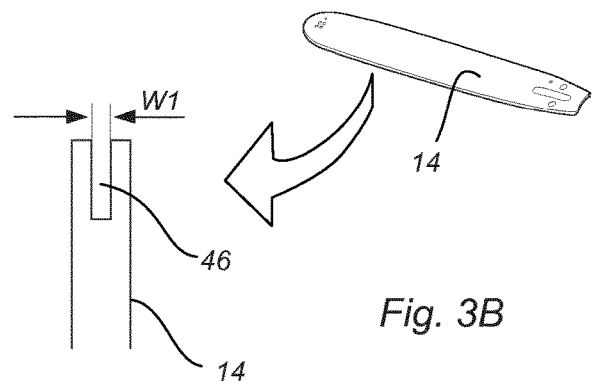
Fig. 3B
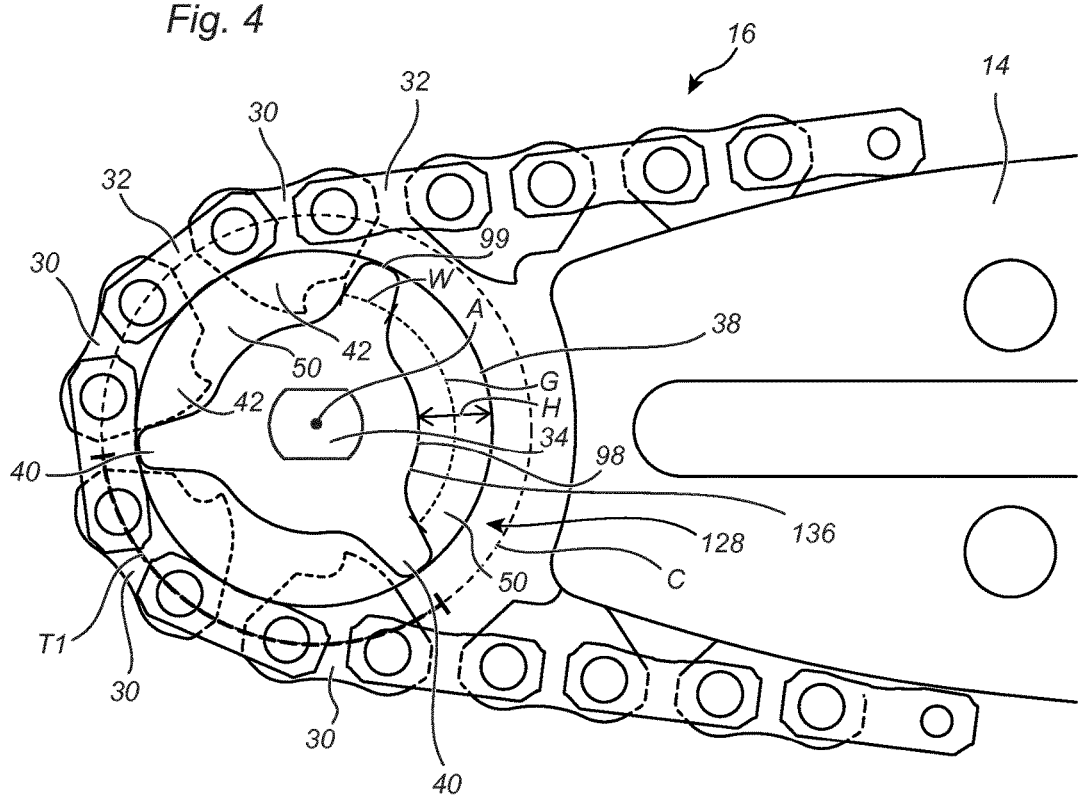
Fig. 3C
Fig. 4

SPROCKET ARRANGEMENT, SAW CHAIN, AND COMBINATION OF SPROCKET ARRANGEMENT AND SAW CHAIN

FIELD OF THE INVENTION

The present invention relates to a chainsaw sprocket arrangement, a saw chain, and combination of a sprocket arrangement and saw chain.

BACKGROUND

Chainsaws have historically been powered by two-stroke internal combustion engines. More recently, as battery technology has evolved, battery-powered electric chainsaws have emerged as a realistic alternative matching the mobility offered by internal combustion engines (ICE). Compared to ICE powered chainsaws, electric chainsaws typically produce far less sound emissions, which is a substantial improvement to work environment. WO2010115438 A1 discloses an exemplary electric chainsaw. There is however always a need for even further improvements to the work environment of people working with chainsaws.

SUMMARY

It is an object of the present invention to solve, or at least mitigate, parts or all of the above mentioned problems. To this end, there is provided a combination of a sprocket arrangement and a saw chain, wherein the saw chain comprises a plurality of drive links, each of said drive links comprising a guide tooth configured to extend into, and be guided along, a guide channel of a chainsaw guide bar; and the sprocket arrangement comprises a sprocket configured to be driven to rotate about a rotation axis and comprising a plurality of sprocket teeth configured to engage with the guide teeth of the drive links of the saw chain, wherein a sprocket tooth spacing between consecutive sprocket teeth of the sprocket relates to a drive link spacing between consecutive drive links of the saw chain such that the guide teeth of two or more drive links may enter between a pair of consecutive sprocket teeth. Thereby, not all drive links will engage with a respective sprocket tooth when passing the sprocket arrangement, which reduces the acoustic noise generated by teeth engaging with drive links. The combination of sprocket arrangement and saw chain may be used for reducing the noise of electric as well as ICE-powered chainsaws. The sprocket tooth spacing may, by way of example, be an integer multiple of the drive link spacing, wherein a typical integer may be e.g. two or three.

According to a second aspect, there is provided a sprocket arrangement for a saw chain, the sprocket arrangement comprising less than five teeth. By way of example, it may have two, three, or four sprocket teeth. The reduced number of teeth, compared to prior art sprocket arrangements, reduces the acoustic noise generated by e.g. drive teeth engaging with drive links. The sprocket arrangement may be used in a combination as suggested hereinabove.

According to a third aspect, there is provided a sprocket arrangement for a saw chain of a handheld chainsaw, the sprocket arrangement having a pitch exceeding 24 mm. Such a pitch is suitable for permitting the guide teeth of two or more drive links between each pair of consecutive sprocket teeth, when combined with the pitch of a typical saw chain, such as ¼", 0.325", ⅜", or 0.404". By way of example, the sprocket arrangement may have a pitch of between 24 mm and 44 mm. Such a pitch is suitable for permitting the guide teeth of two drive links between each pair of consecutive sprocket teeth, when combined with the pitch of a typical saw chain, such as ¼", 0.325", ⅜", or 0.404". A more preferred pitch of the sprocket arrangement may be between 31 mm and 40 mm, which is suitable for permitting the guide teeth of two drive links between each pair of consecutive sprocket teeth when combined with the two most common saw chain pitches, 0.325" and ⅜". The increase in pitch, compared to prior art sprocket arrangements, reduces the noise generated by e.g. drive teeth engaging with drive links. The sprocket arrangement may be used in a combination or sprocket arrangement as suggested hereinabove.

According to an embodiment, the sprocket may be configured to mesh with a saw chain comprising drive links provided with guide teeth, wherein the sprocket is configured to permit the guide teeth of two or more drive links between each pair of consecutive sprocket teeth, when combined with the pitch of a typical saw chain.

According to an embodiment, the sprocket may be configured to be driven to rotate about a rotation axis, wherein said sprocket teeth extend radially, relative to said rotation axis, from a sprocket base, along a radial sprocket tooth height, to a sprocket tip, wherein at a radial distance from said base corresponding to half said radial sprocket tooth height, each of said sprocket teeth has a tangential tooth width and each gap between respective pairs of consecutive sprocket teeth has a tangential gap width, wherein the tangential gap width is greater than the tangential tooth width. According to further embodiments, the tangential gap width may be at least twice the tangential tooth width, at least three times the tangential tooth width, or at least four times the tangential tooth width.

According to an embodiment, the sprocket may be configured to mesh with a forestry saw chain for cutting wood. The forestry saw chain may be provided with saw teeth configured to shave off chips of the material to be cut.

According to an embodiment, the sprocket arrangement may have a pitch diameter of more than 23 mm, and preferably of more than 30 mm. For example, a two-toothed drive sprocket allowing three drive links between each pair of consecutive drive teeth, or a three-toothed drive sprocket allowing two drive links between each pair of consecutive drive teeth, would benefit from having a pitch diameter of between about 33 mm and about 39 mm, if combined with a chain having a typical standard pitch of between 0.325" and ⅜". Similarly, a five-toothed drive sprocket allowing two drive links between each pair of consecutive drive teeth would have a pitch diameter of between about 52 mm and about 65 mm, if combined with a chain having a typical standard pitch of between 0.325" and 0.404". The pitch circle is typically located about 4 mm outside the radial periphery of the sprocket arrangement. Hence, the pitch diameter may typically correspond to a physical diameter of the sprocket arrangement which is about 8 mm smaller than the pitch diameter. Thereby, a two-toothed drive sprocket allowing three drive links between each pair of consecutive drive teeth, or a three-toothed drive sprocket allowing two drive links between each pair of consecutive drive teeth, would benefit from having a physical diameter of between about 23 mm and about 32 mm, if combined with a chain having a typical standard pitch of between 0.325" and ⅜".

According to an embodiment, the sprocket arrangement may further comprise a radial support arrangement configured to support the saw chain in a, with respect to said rotation axis, radial direction, said radial support arrangement being axially offset relative to said sprocket. The radial support of the saw chain will ensure that a substantially uniform tension of the saw chain is maintained regardless of the extent to which sprocket teeth engage with drive links in the tangential, i.e. drive, direction. According to an embodiment, the drive links may be interconnected by tie straps axially offset from the drive links, wherein the radial support arrangement is configured to radially support the tie straps.

According to an embodiment, the radial support arrangement may be configured to rotate with the sprocket about the rotation axis. Such an arrangement may be particularly well suited for a drive sprocket arrangement. Such a radial support arrangement may, by way of example, be configured as a pair of radial support plates arranged on opposite sides of the sprocket. The radial support plates may have a circular outer circumference, and may be suspended concentric with the rotation axis of the sprocket arrangement. The outer circumference of the radial support plates may have a physical diameter as suggested above, with reference to the physical diameter of the sprocket arrangement. Alternatively, the radial support arrangement may be non-rotary, such that the saw chain slides along a radial support face of the radial support arrangement. Such an arrangement may be particularly well suited for a guide bar nose sprocket arrangement, where the guide bar may provide radial support to the saw chain at the guide bar nose.

According to an embodiment, the sprocket arrangement may be a drive sprocket arrangement, the sprocket may be a drive sprocket, and the sprocket teeth may be drive teeth configured to drivingly engage with the guide teeth of the drive links of the saw chain. This reduces the sound emission of the drive sprocket arrangement, which is typically one of the primary sources of noise of an electric chainsaw. Alternatively, the sprocket arrangement may be a guide bar nose wheel. Such a sprocket arrangement does not drive the saw chain, but is instead driven by the saw chain, which also generates acoustic noise.

According to an embodiment, the sprocket arrangement may further comprise a drive shaft connection interface for connecting the sprocket arrangement to a drive shaft of a handheld chainsaw, wherein at least a portion of the sprocket arrangement may be resiliently suspended on the drive shaft connection interface via a resilient suspension arrangement. By using a resilient suspension arrangement, the drive unit is, at least partly, resiliently separated from the chain, which reduces the risk of noise and vibrations propagating through the tool.

According to an embodiment, the resilient suspension arrangement may be resilient in a radial direction, with respect to a rotation axis of the drive shaft connection interface. Thereby, the so-called "polygon effect", resulting in rapidly varying chain tension and vibrations due to the non-infinitesimal chain link length, will be reduced. This also reduces the wear on moving parts since the chain moves smoother and has less irregular movements. Further, a smoother chain movement reduces the risk of the chain de-railing. The resilient suspension arrangement may, by way of example, comprise at least one resilient ring such as a rubber ring, which may provide radial resilience. The resilient ring may, for example, have a hardness of 90 Shore A or less, such as about 30-80 Shore A.

According to an embodiment, said radial support arrangement may be connected to the drive shaft connection interface in a radially resilient manner.

According to an embodiment, the radial support arrangement may comprise a pair of radial support plates arranged on opposite sides of the sprocket, wherein each of said radial support plates may be configured as a rigid ring, which is radially supported relative to the drive shaft connection interface by a respective rubber ring. When operated, the compression of the rubber rings induced by the tension of the saw chain will result in the radial support plates rotating at a different speed than the sprocket, which distributes the wear over the entire periphery of the radial support plates. The radial support plates may be formed of e.g. metal. According to an embodiment, each of said radial support plates may have an outer diameter which is larger than an outer diameter of the drive gear. Thereby, a relatively high degree of resilience may be combined with a proper driving engagement between sprocket and chain.

According to an embodiment, each of said radial support plates may be axially held between the sprocket and a respective axial support plate. According to embodiments, each of said rubber rings may be radially supported by a respective support shoulder arranged e.g. on the sprocket or on the respective axial support plate. The axial support plates may be connected to the sprocket in a radially, tangentially, and/or axially rigid manner. By way of example, at least one of the axial support plates may comprise a drive structure configured to drivingly engage with a mating drive structure of the sprocket. Alternatively or additionally, at least one of the axial support plates may comprise the drive shaft connection interface. The axial support plates may be axially joined to each other, e.g. by riveting or upsetting, with the sprocket and radial support plates sandwiched between them.

According to an embodiment, said sprocket is connected to the drive shaft connection interface in a radially rigid manner.

According to an embodiment, the sprocket arrangement is connected to the drive shaft connection interface in an axially rigid manner.

According to an embodiment, the sprocket is connected to the drive shaft connection interface in a tangentially rigid manner.

The sprocket may be rigid, and may be rigidly connected to the drive shaft connection interface. The sprocket may have solid cogs, and may be integrally formed of metal, such as steel. The sprocket may have the drive shaft connection interface integrally formed within the sprocket. As an exemplary alternative, the sprocket may engage with the drive shaft connection interface via splines of an intermediate component, such as an axial support plate. Any radial support arrangement may be connected to the drive shaft connection interface in a tangentially resilient manner.

According to a fourth aspect, there is provided a combination of a sprocket arrangement and a saw chain, wherein the saw chain comprises a plurality of drive links, each of said drive links comprising a guide tooth configured to extend into, and be guided along, a guide channel of a chainsaw guide bar; and the sprocket arrangement comprises a sprocket configured to rotate about a rotation axis and comprising a plurality of sprocket teeth configured to drivingly engage with the guide teeth of the drive links of the saw chain, wherein a spacing between consecutive teeth of the sprocket relates to a spacing between consecutive drive links of the saw chain such that two or more sprocket teeth may enter between the guide teeth of a pair of consecutive drive links. Thereby, not all sprocket teeth will drivingly engage with a respective drive link when passing the sprocket arrangement, which reduces the noise generated by drive teeth engaging with drive links. According to an embodiment, the saw chain may have a pitch of more than 15 mm.

According to a fifth aspect, there is provided a saw chain for a handheld chainsaw, characterized in having a pitch exceeding 12 mm; more preferably between 16 mm and 22 mm. Such a pitch is suitable for permitting two sprocket teeth of a standard-pitch saw chain sprocket arrangement between each pair of consecutive drive link guide teeth, which reduces the noise generated by sprocket teeth engaging with drive links. The saw chain may be combined with a sprocket arrangement in a combination according to the fourth aspect above.

According to a sixth aspect, there is provided a handheld power tool comprising a drive unit, a drive shaft, and a combination, sprocket arrangement, or saw chain as suggested hereinabove. The handheld power tool may, by way of example, be a chain saw or a pole saw. The drive unit may be an electric motor, which may be battery powered. A benefit with an electric motor, compared to an internal combustion engine, is that the sound emission of an electric motor is lower than that of an internal combustion engine. Thereby, the combinations, sprocket arrangements, or saw chains suggested hereinabove may provide a very dramatic improvement to the total acoustic noise emission of the power tool which, needless to say, may result in a substantially improved work environment.

It is noted that embodiments of the invention may be embodied by all possible combinations of features recited in the claims. Further, it will be appreciated that the embodiments of each aspect described are combinable with the other aspects.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3A represents a side view and a front view of a drive link of a saw chain of the chainsaw of FIG. 1;

FIG. 3B represents a perspective view of a guide bar of the chainsaw of FIG. 1, and a section of a portion of the guide bar;

FIG. 3C is a side view of a portion of the saw chain of the chainsaw of FIG. 1;

FIG. 4 is a side view of a chain and a drive sprocket arrangement of the chainsaw of FIG. 1 according to a first embodiment of the invention, wherein the sprocket arrangement is seen along a rotation axis of a sprocket of the sprocket arrangement;

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
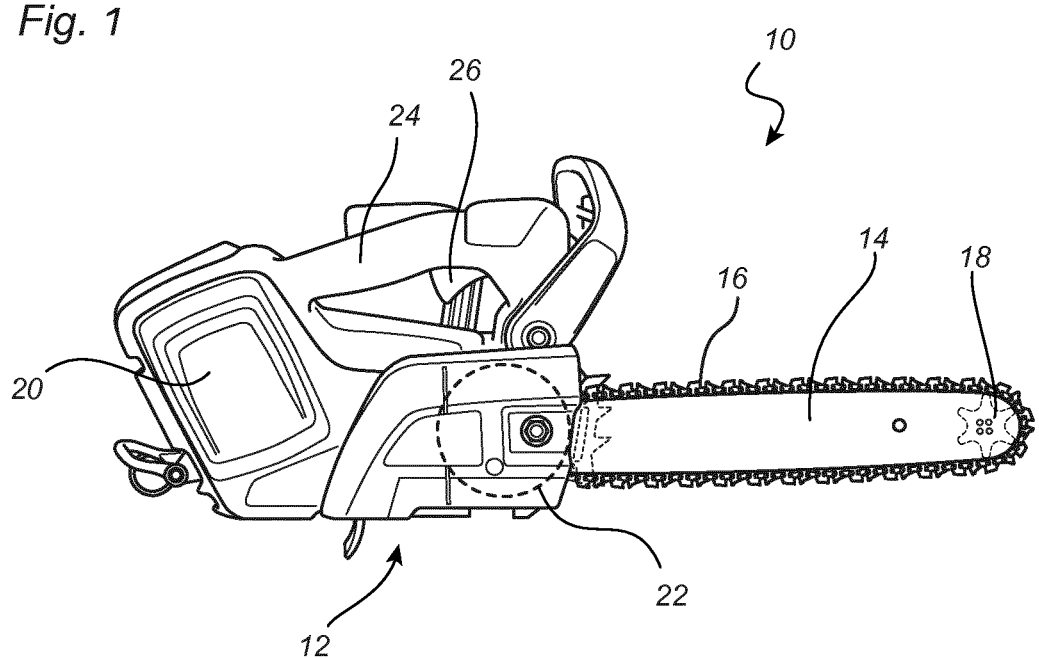
FIG. 1 is a side view of a chainsaw.

FIG. 1 illustrates a handheld chainsaw 10 comprising a drive unit 12, a guide bar 14, and a saw chain 16 configured as an endless loop, guided along the guide bar 14 between a drive sprocket arrangement (not illustrated) and a nose sprocket arrangement 18. The drive unit 12 comprises battery 20 and an electric motor 22, powered by the battery 20. A handle 24 is provided with a trigger 26 for operating the electric motor 22.

Figure 2:
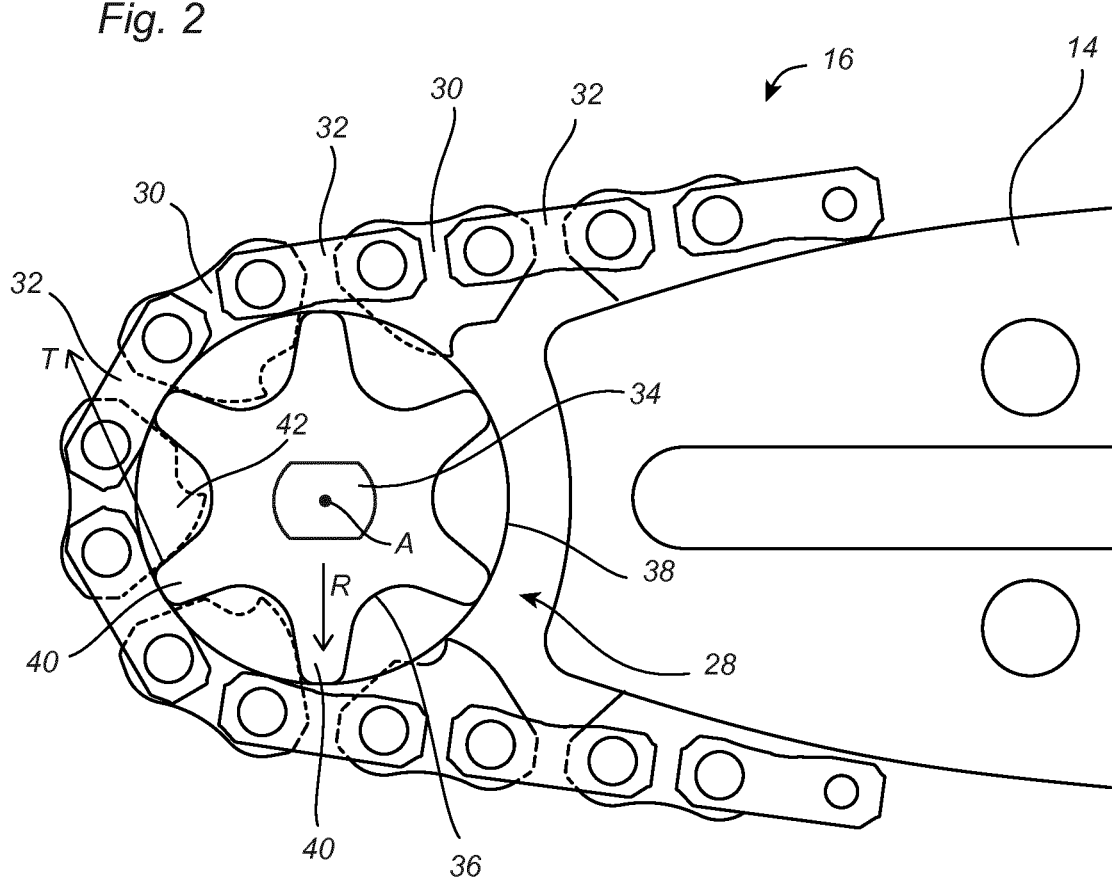
FIG. 2 is a side view of a drive sprocket arrangement of the chainsaw of FIG. 1.

FIG. 2 illustrates the guide bar 14, the saw chain 16, and a drive sprocket arrangement 28, some features of which are configured in accordance with design principles established in the art. The saw chain 16 comprises a plurality of drive links 30 interconnected by tie straps 32. For ease of illustration, all tie straps 32 of FIG. 2 are illustrated without a saw tooth, even though it will be appreciated that at least some of the tie straps 32 may typically be provided with a saw tooth. The portions of the saw chain 16 which are located within the sprocket arrangement 28 are illustrated by dashed lines. The electric motor 22 (FIG. 1) is drivingly connected to a drive shaft 34, which drivingly engages with the drive sprocket arrangement 28 to rotate the sprocket arrangement 28 about a rotation axis A, concentric with the drive shaft and perpendicular to the general plane of extension of the sprocket arrangement 18. Some sprocket arrangements 28 have a drive shaft connection interface configured to fixedly attach to the drive shaft 34, whereas other sprocket arrangements 28 have internal splines configured to allow the sprocket arrangement to float on the drive shaft 34 along the axial direction A. The sprocket arrangement 28 is of so-called rim type, i.e. it comprises a sprocket 36 axially aligned with the drive links 30, and a pair of radial support plates 38, which are positioned on opposite axial sides of the sprocket 36 and radially support the tie straps 32 of the saw chain 16. The rotation axis A of the sprocket 36 defines a cylindrical coordinate system of the sprocket arrangement, with a radial direction R facing perpendicularly away from the rotation axis A, and a tangential direction T corresponding to the movement direction of any point rotating about the axis A. The radial support plates 38 are circular and concentric with the rotation axis A. Typically, the sprocket 36 and radial support plates 38 may be integrally formed. For clarity of illustration, the sprocket 36 is illustrated in solid lines even though it's located behind a radial support plate 38. A prior art sprocket 36 typically comprises between six and twelve sprocket teeth 40, which are configured to drivingly engage with the drive links 30 of the saw chain 16; in the illustrated example, the sprocket 36 comprises six sprocket teeth 40. For the purpose, each drive link 30 comprises a guide tooth 42 configured to extend into a space between the radial support plates 38, and engage with and be driven by the sprocket teeth 40 in a tangential direction, with respect to said rotation axis A. The pitch of the sprocket 36 is carefully matched to the pitch of the saw chain 16, such that all drive links 30 will, when passing the sprocket arrangement 28, engage with and be driven by a respective sprocket tooth 40 of the drive sprocket 36.

FIG. 3A illustrates a drive link 30 in greater detail. The drive link comprises a leading rivet bore 44a and a trailing rivet bore 44, each of which is connected to a pair of adjacent tie straps 32 (FIG. 2) by rivets.

FIG. 3B illustrates a detail of a cross-section of the guide bar 14 (FIG. 1). A guide channel 46 extends along the periphery of the guide bar 14, which guide channel 46 has a width W1. Referring back to FIG. 3A, the guide tooth 42 has a width W2<W1, which width W2 is adapted to allow the guide tooth 42 to be guided within the guide channel 46 (FIG. 3B).

FIG. 3C illustrates an exemplary saw chain 16 in greater detail. Each drive link 30 is, at each longitudinal end as seen along the longitudinal direction L of the chain, connected to a pair of tie straps 32, which are located on opposite sides of the plane of the drive link 30 such that in the view of FIG. 3C, only one tie strap 32 of each such pair is visible. Some of the tie straps 32 are provided with a respective saw tooth 48 to form a cutting link 32a, whereas other tie straps 32b are not provided with any saw tooth. For a typical forestry saw chain 16 for cutting wood, the saw tooth 48 has a sharp cutting edge 97 configured to shave off wood chips from the material being cut.

The pitch of the saw chain 16 is defined as half the distance D between the trailing rivet pivot axes P of two consecutive drive links 30.

FIG. 4 illustrates the guide bar 14, the saw chain 16, and a drive sprocket arrangement 128 according to a first exemplary embodiment of the present invention. The drive sprocket arrangement 128 is identical to the drive sprocket arrangement 28 of FIG. 2 except in a few details, which will be pointed out in the following. Again, the sprocket arrangement 128 is of rim type, comprising a sprocket 136 integrally formed with a pair of radial support plates 38. The sprocket 136 differs from the sprocket 36 of FIG. 2 in that the pitch of the sprocket 136 does not match the pitch of the saw chain 16. Instead, compared to the sprocket 36 FIG. 2, the number of sprocket teeth 40 of the sprocket 136 of FIG. 4 has been divided in half by removing, compared again to the sprocket 36 of FIG. 2, every second sprocket tooth 40, resulting in a three-toothed sprocket 136. Thereby, the sprocket tooth spacing 50 between each pair of consecutive sprocket teeth 40 of the sprocket 136 relates to the drive link spacing D (FIG. 3C) between consecutive drive links 30 of the saw chain 16 such that the guide teeth 42 of two consecutive drive links 30 may enter between a pair of consecutive sprocket teeth 40. For a typical saw chain pitch of ¼", 0.325", ⅜", or 0.404", this translates to a sprocket pitch, i.e. a tangential distance T1 between consecutive sprocket teeth along the pitch circle C, of between about 24 mm and about 44 mm. For a chainsaw sprocket arrangement 28, 128, the pitch circle C is defined as the circle followed by the centres of the chain pins, e.g. rivets, as the sprocket arrangement 28, 128 revolves in mesh with the chain 16. It is pointed out that although the three-toothed sprocket arrangement 128 of FIG. 4 has only half the number of teeth compared to the six-toothed sprocket arrangement 28 of FIG. 2, the two sprocket arrangements 28, 128 have the same pitch diameter, i.e. diameter of the pitch circle C. For a three-toothed sprocket arrangement 128 allowing two drive links 30 of a typical standard saw chain having a pitch of between 0.325" and ⅜", this would correspond to a pitch diameter of between about 33 mm and about 39 mm. Each sprocket tooth 40 extends radially, relative to the rotation axis A, from a sprocket base 98, along a radial sprocket tooth height H, to a sprocket tip 99. At a radial distance from the sprocket base 98 corresponding to half the radial sprocket tooth height H, each of said sprocket teeth 40 has a tangential tooth width W, and each gap 50 between respective pairs of consecutive sprocket teeth 40 has a tangential gap width G. In the illustrated embodiment, the tangential gap width G is several times greater than the tangential tooth width W.

FIGS. 5-8 illustrate a drive sprocket arrangement 228 according to a second exemplary embodiment. Similar to the sprocket arrangement 128 of FIG. 4, the sprocket arrangement 228 of FIGS. 5-8 comprises a sprocket 236 provided with three sprocket teeth 40 configured to drivingly engage with the saw chain 16 (FIG. 4), wherein the pitch of the sprocket is configured to allow the guide teeth 42 (FIG. 4) of two consecutive drive links 30 to enter between a pair of consecutive sprocket teeth 40. However, as is illustrated in the exploded view of FIG. 5, the sprocket arrangement 228 is not integrally formed in a single piece, but is instead composed of a plurality of distinct parts. Moreover, the sprocket arrangement 228 comprises a resilient radial support arrangement configured to radially support the saw chain 16, which will be elucidated in the following.

Figure 5:
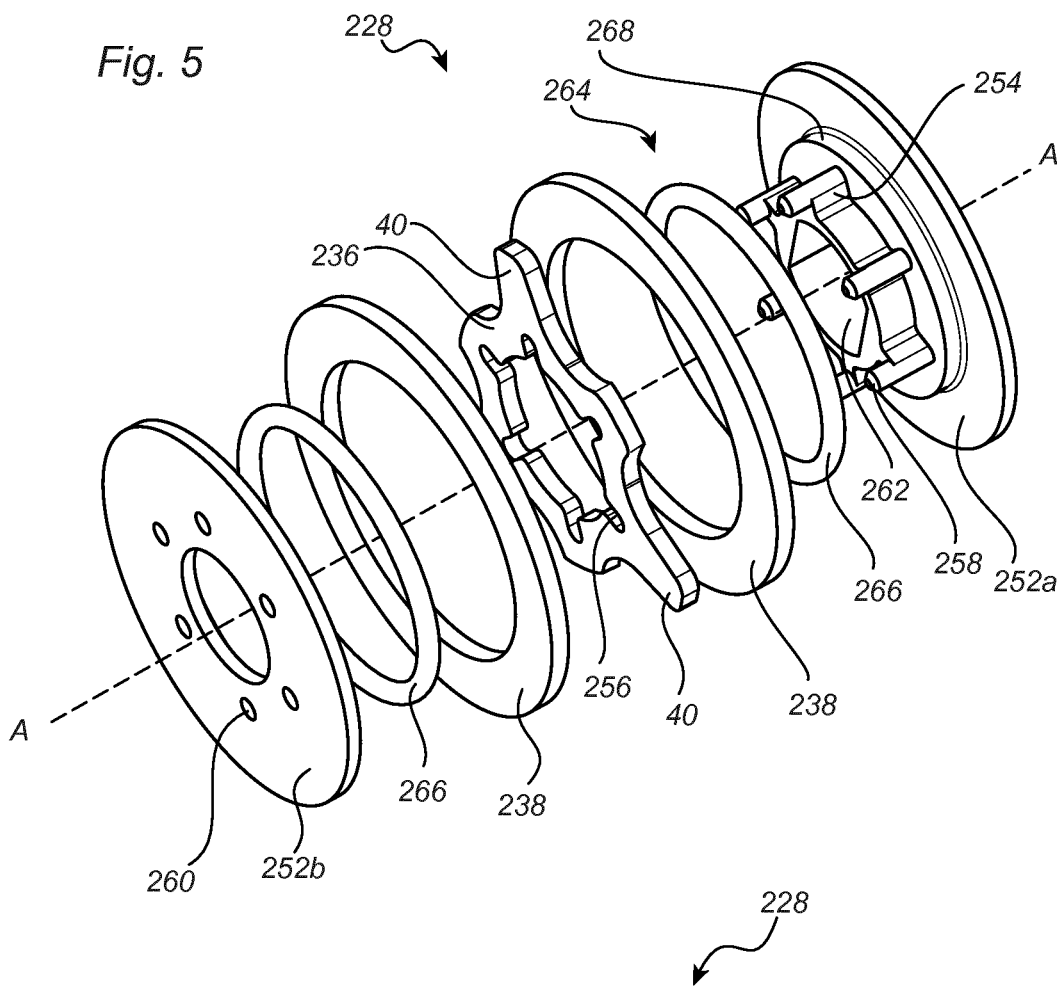
FIG. 5 is an exploded view of a drive sprocket arrangement of the chainsaw of FIG. 1 according to a second embodiment of the invention, wherein the exploded view is seen in perspective.
Figure 6:
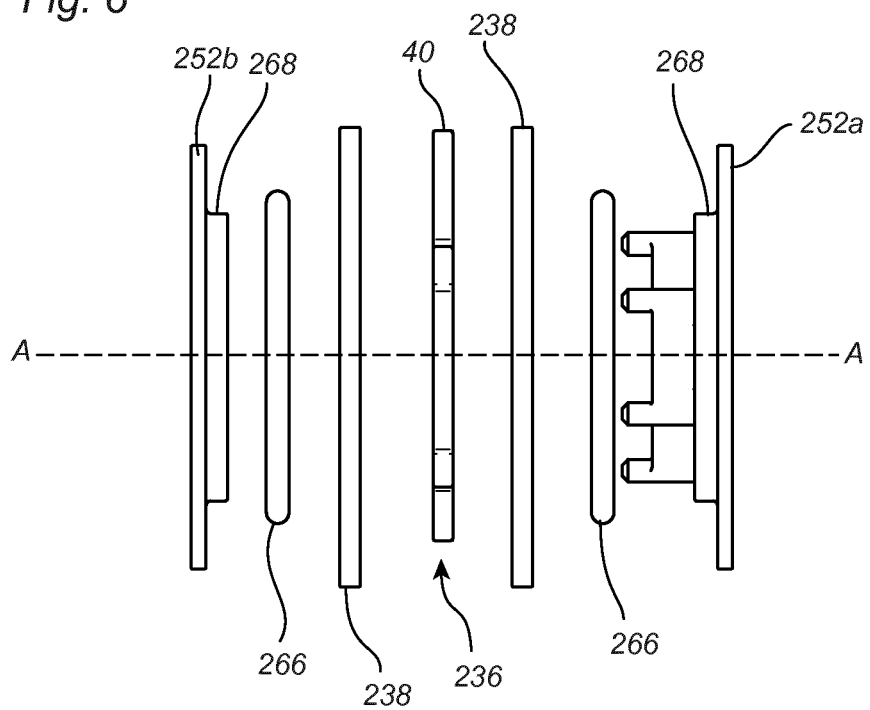
FIG. 6 is an exploded view of the drive sprocket arrangement of FIG. 5, wherein the exploded view is seen from a side perpendicular to a rotation axis of a sprocket of the sprocket arrangement.

Starting with the view of FIG. 5, which illustrates the sprocket arrangement 28 exploded along the rotation axis A, the sprocket arrangement 228 comprises a sprocket 236 sandwiched between a pair of radial support plates 238, which radial support plates 238 are configured to support the tie straps 32 (FIG. 4) in the radial direction. The sprocket 236 and radial support plates 238 are held together in the axial direction A by a first axial support plate 252a and a second axial support plate 252b, which are rigidly connected to each other and sandwich the sprocket 236 and radial support plates 238 between them. The first axial support plate 252a is provided with outer splines 254 mating with inner splines 256 of the sprocket 236, thereby rigidly engaging with the sprocket 236 in the radial direction as well as the tangential direction. Rivets 258, integrally formed with the first axial support plate 252a, mate with rivet holes 260 of the second axial support plate 252b, such that when assembling the sprocket arrangement 228, the components are brought together in the axial direction A until the rivets 258 penetrate the rivet holes 260, and thereafter, the rivets are upset to firmly lock the axial support plates 252a, 252b together. The first axial support plate 252a also comprises a drive shaft connection interface 262, which is configured as a socket shaped to receive the drive shaft 32 (FIG. 2). In an alternative configuration (not illustrated), the rivets 258 may be separate from the first axial support plate 252a. In such a configuration, also the first axial support plate 252a may instead be provided with rivet holes similar to the rivet holes 260 of the second axial support plate, for receiving said rivets.

The radial support plates 238 are held by the axial support plates 252a, 252b via a resilient suspension arrangement 264, which allows the radial support plates 238 to resiliently move somewhat in the plane defined by the radial and tangential directions. The resilient suspension arrangement 264 comprises a pair of rubber O-rings 266, each of which is radially supported by a support shoulder 268 arranged on the axially inner face of a respective one of the axial support plates 252a, 252b.

Figure 7:
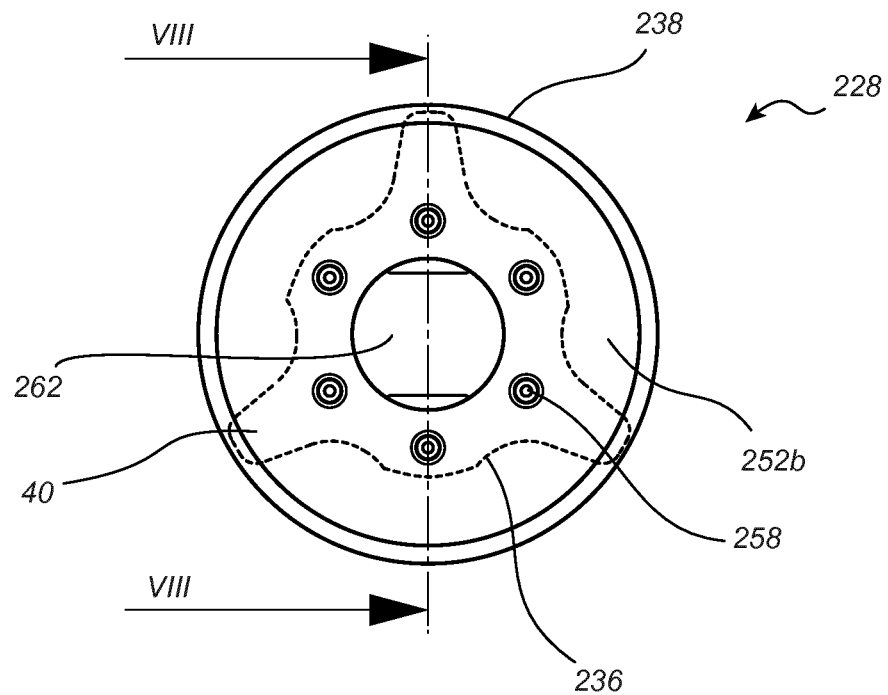
FIG. 7 is a side view of the drive sprocket arrangement of FIGS. 5-6, as seen along the rotation axis.
Figure 8:
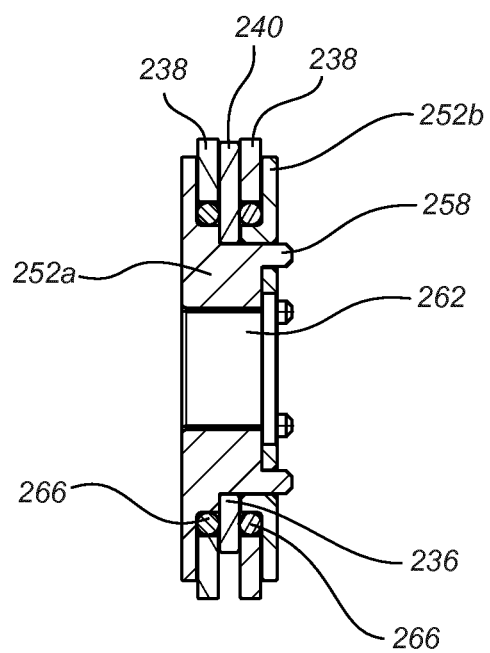
FIG. 8 illustrates a section of the sprocket arrangement of FIGS. 5-7, wherein the section is taken along the line VIII-VIII of FIG. 7.

FIG. 7 illustrates the sprocket arrangement as seen from the side of the second axial support plate 252b, along the rotation axis A. The outer contour of the sprocket 236, which is hidden behind axial and radial support plates 252b, 238, is illustrated in dashed lines. The resiliently suspended radial support plates 238 define the radially outermost periphery of the sprocket arrangement 228, which is even further elucidated in the cross-section of FIG. 8. Referring to FIG. 8, the radial support plates 238 each have a larger diameter than the axial support plates 252a, 252b. Similarly, the sprocket 236 has a diameter, defined as twice the distance between the rotation axis A and the radial end of the teeth 40, which is smaller than the diameter of the radial support plates 238.

Figure 9:
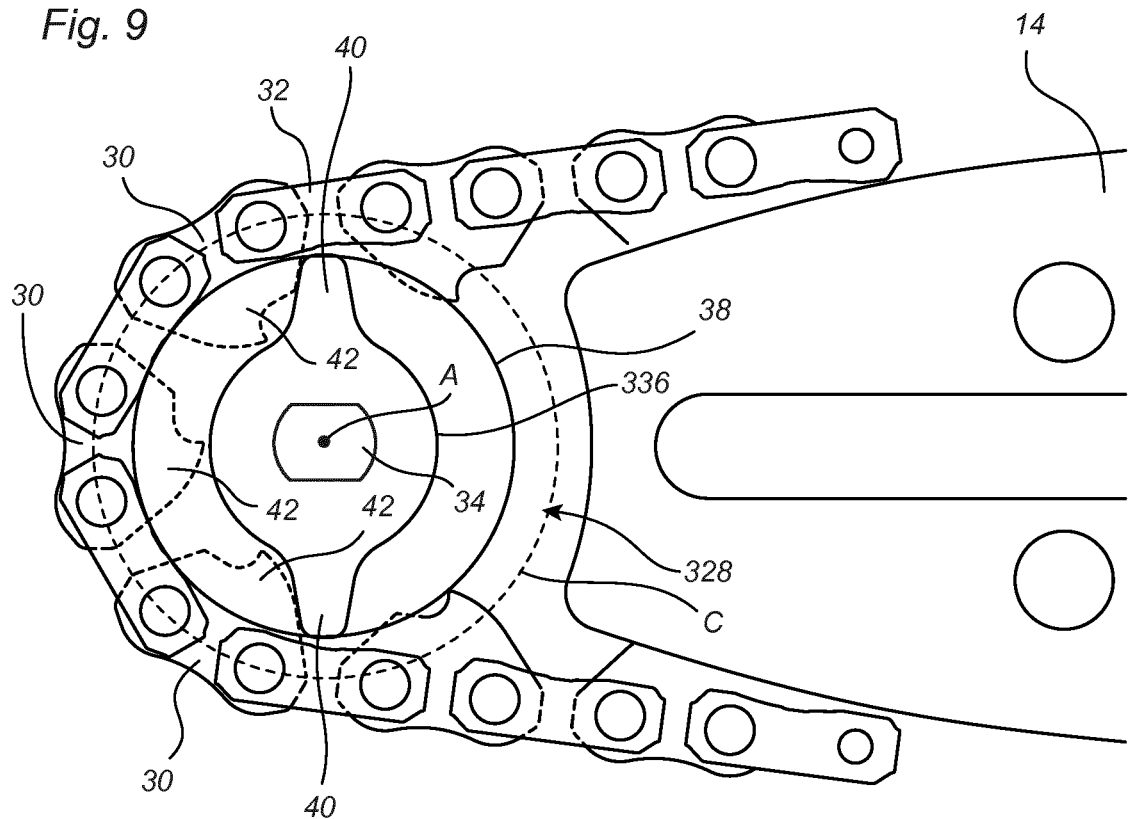
FIG. 9 is a side view of a chain and a drive sprocket arrangement of the chainsaw of FIG. 1 according to a third embodiment of the invention, wherein the sprocket arrangement is seen along a rotation axis of a sprocket of the sprocket arrangement.

FIG. 9 illustrates a drive sprocket arrangement 328 according to a third exemplary embodiment. The drive sprocket arrangement 328 is identical to the drive sprocket arrangement 128 of FIG. 4 except in a few details, which will be pointed out in the following. Again, the sprocket arrangement 328 is of rim type, comprising a sprocket 336 integrally formed with a pair of radial support plates 38. The sprocket 336 differs from the sprocket 136 of FIG. 4 in that it is only provided with two sprocket teeth 40 configured to drivingly engage with the saw chain 16. Thereby, at each given moment, at least one sprocket tooth 40 will be in driving engagement with the saw chain 16. The pitch circle C of the sprocket 336 of FIG. 9 has the same pitch diameter as the sprockets 36 and 136 of FIGS. 2 and 4, such that the guide teeth 42 of three consecutive drive links 30 are allowed to enter between a pair of consecutive sprocket teeth 40.

Figure 10:
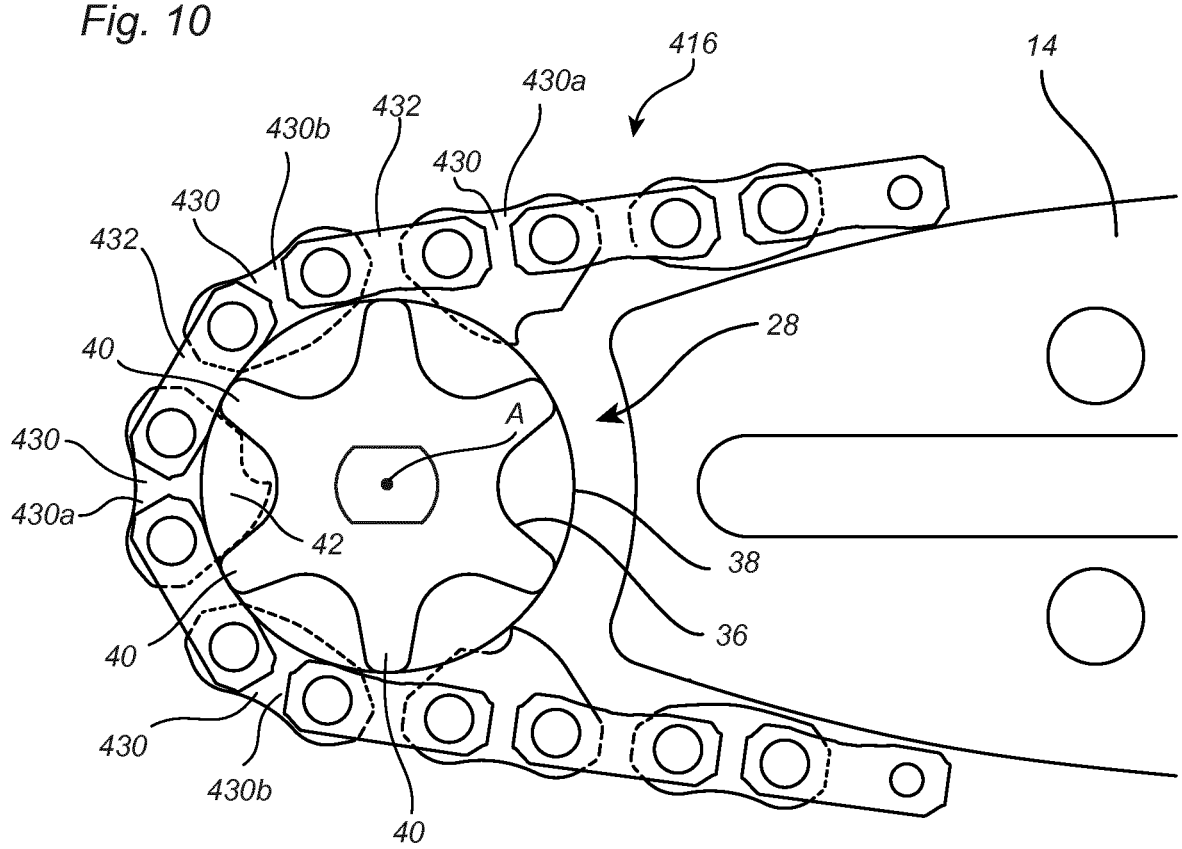
FIG. 10 is a side view of a chain and a drive sprocket arrangement of the chainsaw of FIG. 1 according to a fourth embodiment of the invention, wherein the sprocket arrangement is seen along a rotation axis of a sprocket of the sprocket arrangement.

FIG. 10 illustrates a fourth exemplary embodiment of the present invention. In the embodiment of FIG. 10, the sprocket arrangement 28 of FIG. 2, which has a pitch in accordance with design principles established in the art, is combined with a modified saw chain 416. The saw chain 416 of FIG. 10 is identical to the saw chain 16 of FIG. 2 except in a few details, which will be pointed out in the following. Similar to the saw chain 16 of FIG. 2, the saw chain 416 comprises axially central, with respect to the rotation axis A, links 430, which are axially aligned with the sprocket 36. The axially central links 430 are interconnected by axially offset tie straps 32, which ride on the radial support plates 38. However, the saw chain 416 of FIG. 10 differs from the saw chain 16 of FIG. 2 in that only some of the central links 430 are provided with a respective guide tooth 42 to form a respective drive link 430a, whereas other central links 430b are not provided with a respective guide tooth configured to engage with the sprocket teeth 40 of the sprocket arrangement 28, such that they do not operate as drive links. In the illustrated example, every second central link 430 of the saw chain 416 has a respective guide tooth 42. Thereby, the saw chain has a pitch, again measured as half the distance between the trailing rivet pivot axes of two consecutive drive links 430a, of twice the pitch of the saw chain 16 of FIG. 2. The spacing between consecutive teeth 40 of the sprocket 36 relates to the spacing between consecutive drive links 430a of the saw chain 416 such that two sprocket teeth 40 may enter between the guide teeth 42 of a pair of consecutive drive links 430a. Assembling the saw chain 416 using links for standard saw chains 16 (FIG. 2) having anyone of the most common standard pitches of 0.325", ⅜", or 0.404" would result in a saw chain pitch of the saw chain 416 of 0.650", ⅝", or 0.808".

Figure 11:
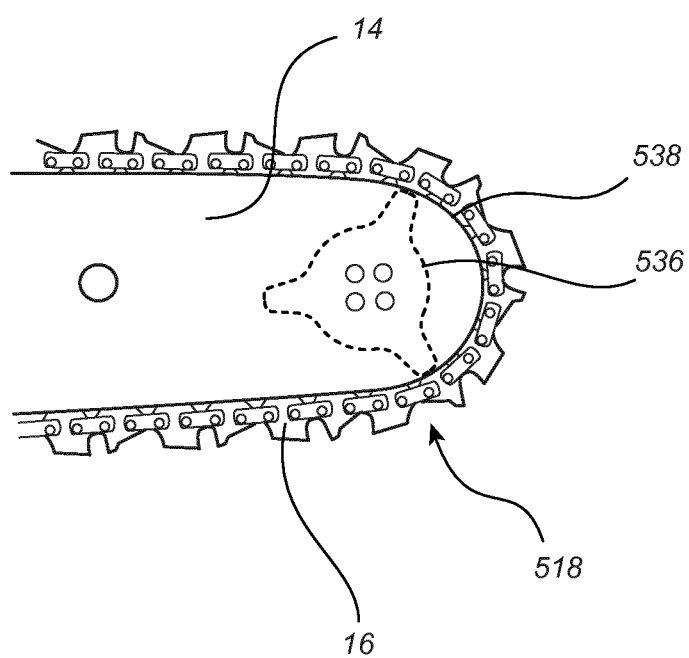
FIG. 11 is a side view of a guide bar, a chain, and a nose sprocket arrangement of the chainsaw of FIG. 1 according to a fifth embodiment of the invention, wherein the sprocket arrangement is seen along a rotation axis of a sprocket of the sprocket arrangement.

FIG. 11 illustrates a fifth exemplary embodiment of the present invention. In the embodiment of FIG. 11, a nose sprocket arrangement 518 of the guide bar 14 (FIG. 1) comprises a sprocket 536 which has a sprocket tooth spacing between consecutive sprocket teeth, the sprocket tooth spacing relating to the drive link spacing between consecutive drive links of the saw chain 16 such that the guide teeth 42 (FIG. 3C) of two drive links 30 may enter between a pair of consecutive sprocket teeth. Thereby, the noise of the nose sprocket arrangement 518 may be reduced. In the embodiment of FIG. 11, the periphery 538 of the guide bar 14 operates as a radial support arrangement, radially supporting the saw chain 16.

The invention has mainly been described above with reference to a few embodiments. However, as is readily appreciated by a person skilled in the art, other embodiments than the ones disclosed above are equally possible within the scope of the invention, as defined by the appended patent claims. In the claims, the word "comprising" does not exclude other elements or steps, and the indefinite article "a" or "an" does not exclude a plurality.

The invention claimed is:

1. An apparatus comprising:
a sprocket arrangement; and
a saw chain,
wherein the saw chain comprises a plurality of drive links, each of said drive links comprising a guide tooth configured to extend into, and be guided along, a guide channel of a chainsaw guide bar,
wherein the sprocket arrangement comprises a sprocket configured to be driven to rotate about a rotation axis and comprising a plurality of sprocket teeth configured to engage with the guide teeth of the drive links of the saw chain,
wherein a sprocket tooth spacing between consecutive ones of the sprocket teeth of the sprocket relates to a drive link spacing between consecutive ones of the drive links of the saw chain such that the guide teeth of two or more of the drive links enter between a pair of consecutive ones of the sprocket teeth,
wherein the apparatus further comprises a drive shaft connection interface for connecting the sprocket arrangement to a drive shaft of the apparatus,
wherein a radial support arrangement is connected to the drive shaft connection interface in a radially resilient manner,
wherein the radial support arrangement comprises a pair of radial support plates arranged on opposite sides of the sprocket, and
wherein each of said radial support plates is axially held between the sprocket and a respective axial support plate of the apparatus.

2. The apparatus of claim 1, wherein the number of the plurality of sprocket teeth is less than five.

3. The apparatus of claim 1, wherein the sprocket comprises a pitch exceeding 24 mm.

4. The apparatus of claim 3, wherein the sprocket is configured to mesh with the saw chain when combined with the pitch of the saw chain.

5. The apparatus of claim 1, wherein the sprocket is configured to be driven to rotate about the rotation axis, wherein said sprocket teeth extend radially, relative to said rotation axis, from a sprocket base, along a radial sprocket tooth height, to a sprocket tip, wherein at a radial distance from said sprocket base corresponding to half of said radial sprocket tooth height, each of said sprocket teeth has a tangential tooth width and each gap between respective pairs of consecutive ones of the sprocket teeth has a tangential gap width, wherein the tangential gap width is greater than the tangential tooth width.

6. The apparatus of claim 1, wherein the saw chain is a forestry saw chain for cutting wood, and
wherein the sprocket arrangement has a pitch diameter of more than 30 mm.

7. The apparatus of claim 1, wherein the sprocket arrangement further comprises a radial support arrangement configured to support the saw chain in a, with respect to said rotation axis, radial direction, said radial support arrangement being axially offset relative to said sprocket.

8. The apparatus of claim 7, wherein the radial support arrangement is configured to rotate with the sprocket about the rotation axis.

9. The apparatus of claim 1, wherein the sprocket arrangement is a drive sprocket arrangement, the sprocket is a drive sprocket, and the sprocket teeth are drive teeth configured to drivingly engage with the guide teeth of the drive links of the saw chain.

10. The apparatus of claim 9, wherein at least a portion of the sprocket arrangement is resiliently suspended on the drive shaft connection interface via a resilient suspension arrangement.

11. The apparatus of claim 10, wherein the resilient suspension arrangement is resilient in a radial direction, with respect to a rotation axis of the drive shaft connection interface.

12. The apparatus of claim 10, wherein each of said radial support plates is configured as a rigid ring, which is radially supported relative to the drive shaft connection interface by a respective rubber ring of the resilient suspension arrangement.

13. The apparatus of claim 10, wherein said sprocket is operably coupled to the drive shaft connection interface in a radially rigid manner.

14. The apparatus of claim 10, wherein the sprocket arrangement is operably coupled to the drive shaft connection interface in an axially rigid manner.

15. The apparatus of claim 10, wherein the sprocket is operably coupled to the drive shaft connection interface in a tangentially rigid manner.

* * * * *